Oct. 5, 1948. T. M. ELGERSMA 2,450,587
POULTRY BIT
Filed April 18, 1945
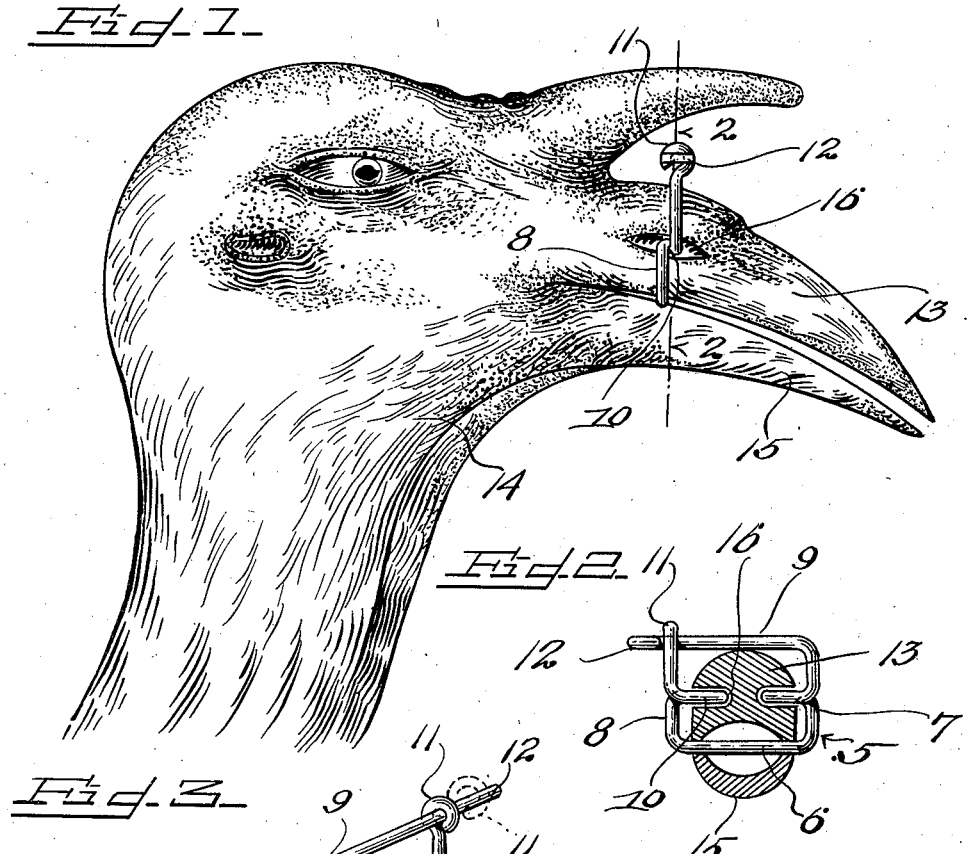
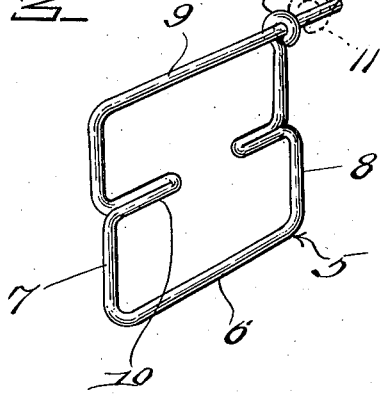
Inventor
THEODORE M. ELGERSMA
By Clarence A. O'Brien
and Harvey B. Jacobson
Attorneys Patented Oct. 5, 1948

2,450,587

UNITED STATES PATENT OFFICE 2,450,587

POULTRY BIT

Theodore M. Elgersma, Fresno, Calif., assignor of one-half to Alta May Elgersma, Fresno, Calif.

Application April 18, 1945, Serial No. 588,901

1 Claim. (Cl. 119—97)

The present invention relates to a new and useful improvement in poultry bit designed for attaching to the beak of turkeys and other poultry to prevent the poultry from fighting, picking or otherwise injuring other poultry.

An important object of the present invention is to provide a device of this character which may be readily applied to the beak of the poultry without causing injury thereto, and which does not interfere with the poultry's breathing, eating or drinking and which prevents the poultry from injuring or picking other poultry.

A further object of the invention is to provide a device of this character embodying means for securing the bit in position without danger of loss.

A still further object is to provide a device of this character of simple and practical construction, which is efficient and reliable in use, relatively inexpensive to manufacture and otherwise well adapted for the purpose for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a side elevational view of the head of a turkey showing the bit in position thereon.

Figure 2 is a sectional view taken substantially on a line 2—2 of Figure 1, and

Figure 3 is a perspective view of the bit.

Referring now to the drawing in detail wherein for the purpose of illustration I have disclosed a preferred embodiment of invention. The numeral 5 designates the bit generally which is constructed of a single strand of wire bent substantially in the form of a square and including a lower bar 6, side bars 7 and 8 and a top bar 9.

The side bars 7 and 8 are bent intermediate their ends to form inwardly projecting tongues 10 with their inner ends terminating in spaced relation to each other and with the upper end of the side bar 8 bent to form an eye 11 in which the free end of the top bar 9 is received.

The free end of the top bar 9 is bent to form a head 12 outwardly of the eye 11 to prevent retraction of the free end of the top bar 9 from the eye.

In placing the bit in position on the upper beak 13 of a turkey or other fowl or poultry 14 the bottom bar 6 is positioned transversely under the upper beak 13 between the upper beak and the lower beak 15 as indicated in Figure 2 of the drawings, the bit being inserted prior to the formation of the head 12 on the upper bar 9 and with the free end of the upper bar 9 removed from the eye 11 so that the side bars 7 and 8 may be spread apart while inserting the bit on the beak 13.

The upper ends of the side bars 7 and 8 are then squeezed toward each other to insert the tongues 10 in the nostrils 16 of the upper beak and the free end of the upper bar 9 is inserted in the eye 11 and the end of the bar 9 peened or upset to form the head 12 whereby to prevent spreading apart of side bars 7 and 8. The bit thus will be held in position on the upper beak 13 of the poultry against accidental displacement.

The lower bar 6 extending transversely between the upper beak 13 and lower beak 15 will keep the beaks partly open and thus restrain the poultry from picking other fowl or poultry.

In view of the foregoing description taken in conjunction with the accompanying drawing it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A bit for poultry comprising a wire member having substantially the form of a hollow square including a bottom bar, side bars and a top bar, said bottom bar being adapted for insertion transversely under the upper beak of the poultry and with the top bar extending transversely above the beak, inwardly projecting tongues on the side bars adapted to enter the nostrils of the beak, and an eye formed at the upper end of one of said side bars adapted for receiving one end of the top bar, said end of the top bar being bendable alongside said eye to prevent retraction of the top bar from the eye.

THEODORE M. ELGERSMA.

REFERENCES CITED

The following references are of record in the file of this patent:

UNITED STATES PATENTS

| Number | Name | Date |
|---|---|---|
| 280,642 | Marvin | July 3, 1883 |
| 546,905 | Schild | Sept. 24, 1895 |
| 1,877,897 | Kosten et al. | Sept. 20, 1932 |
| 2,286,001 | Nichols et al. | June 9, 1942 |
| 2,398,316 | Litton | Apr. 9, 1946 |

FOREIGN PATENTS

| Number | Country | Date |
|---|---|---|
| 3,337 | Great Britain | 1895 |